(No Model.)

H. W. LIBBEY.
ELECTRIC BICYCLE.

No. 596,273. Patented Dec. 28, 1897.

Witnesses. Inventor.

UNITED STATES PATENT OFFICE.

HOSEA W. LIBBEY, OF BOSTON, MASSACHUSETTS.

ELECTRIC BICYCLE.

SPECIFICATION forming part of Letters Patent No. 596,273, dated December 28, 1897.

Application filed December 14, 1895. Serial No. 572,206. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Electric Bicycles, of which the following, taken in connection with the accompanying drawings, is a specification.

My invention relates to electrically-propelled bicycles, and has for its object to produce a vehicle that will be simple, compact, and efficient; and it consists in the novel features of the same, as will be hereinafter more fully set forth.

Figure 1:
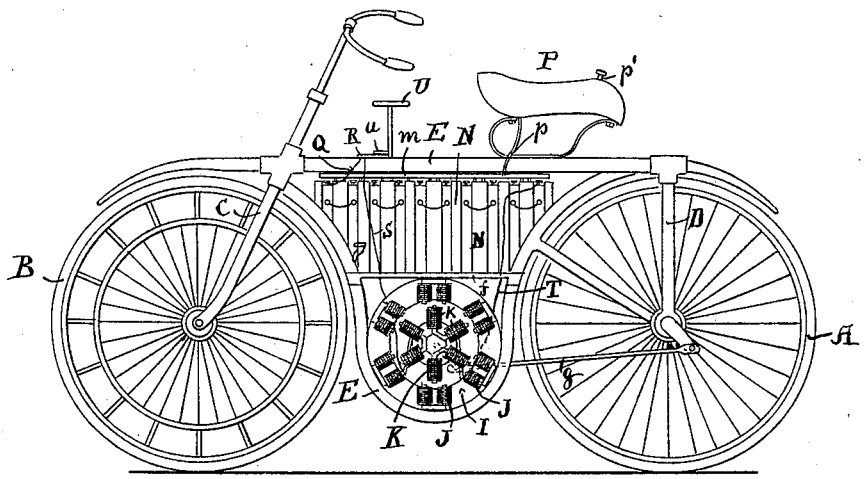
Figure 2:
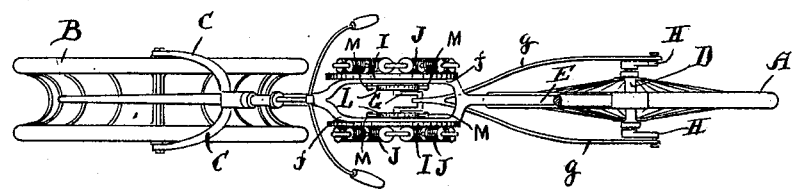
Figure 3:
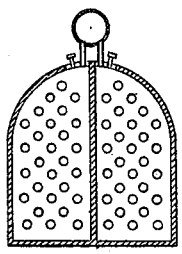

Referring to the accompanying drawings, Figure 1 represents a side view of a bicycle embodying my invention. Fig. 2 is a plan or top view of same, and Fig. 3 is a vertical transverse section through the battery.

A represents the rear or driving wheel; B, the front or steering wheel. The front wheel B is mounted in a fork C, operated by handles in the ordinary manner, and the rear wheel A is mounted in a suitable fork D, said forks being connected together by a suitable frame E, preferably of the loop pattern.

The front or steering wheel B is formed with a double tread, so that the vehicle will have three points of rest. I prefer to employ a wheel constructed according to a patent granted to me and dated January 24, 1893, No. 490,391.

The lower part of the loop of the frame E is split or divided to form a loop $f$, on each side of which is fitted a bearing, in which bearings is mounted a crank-axle G, that by a divided rod $g$ is connected to the cranks H of the axle of the driving-wheel A. To each side of the loop $f$ is secured a flat metal ring I, that carrries horseshoe-magnet J, and to a plate attached to each end of the crank-axle G, outside of the loop $f$, are secured magnets K, and upon said crank-axle G, just inside the loop $f$, are mounted ordinary commutators L, the brushes M of which are carried by said loop $f$.

Above the motor on the loop $f$ is secured an electric battery N. I prefer to employ a battery of the construction shown and described in a patent granted to me the 29th day of August, 1893, No. 504,130; but in this case the cells of the battery are divided by a vertical partition, as shown in Fig. 3, thus forming, as it were, two batteries. P is a seat that forms a tank or reservoir for the exciting fluid, which is by a flexible tube $p$ conducted to a tube $m$, arranged longitudinally above the battery, and thence to the cells by small tubes. A nozzle $p'$ is fitted at the rear of the seat P, through which this tank or reservoir can be filled with exciting fluid. This nozzle is closed by a screw-cap.

The negative wires Q of the double battery are connected to an electric controller R, from which wires S run to the brushes M on one side of the commutators L, and the positive elements are connected with the brushes on the other side by wires T. The electric controller R is operated by a wheel U upon an upright rod fitted with an arm $u$ to make and break the circuit.

The motors may be of any desired construction, but arranged a suitable distance apart and connected together by a crank-shaft, the crank of which rotates between said motors and imparts motion to a divided rod, as before described.

On each side of the front portion of the frame is fitted a foot-rest, and the machine may be fitted with a brake of ordinary construction.

It will be seen that by this construction a very compact and powerful machine is produced, the vehicle being driven by two electric motors operating a crank-shaft, which by the divided rod communicates motion to both cranks of the driving-wheel, and should one of the motors be disabled from any cause the machine can be still propelled by the uninjured one.

Although it is intended to have two motors, one on each side, to drive the crank-shaft, it is obvious that a motor on one side only might be employed.

What I claim is—

1. In a bicycle, the combination, with a frame, a portion of which is bifurcated, of an electric battery upon the bifurcation, a motor upon each side of the bifurcation of the frame, an axle in said bifurcated portion common to both of said motors, and a bifurcated pitman connecting the said crank-shaft with the driving-wheel, substantially as set forth.

2. In a bicycle, the combination, with a looped frame, the lower portion of which is bifurcated, of an electric battery upon the bifurcation, a metal ring secured to each side of the bifurcation, a series of horseshoe-magnets secured to each of said rings, a crank through the bifurcated portions of the frame concentric with the rings, magnets upon each end of the crank outside of the looped portion, and means for communicating the motion of the crank to the driving-wheels, substantially as set forth.

In testimony whereof I have signed my name to this specification, in the presence of two subscribing witnesses, on this 30th day of November, A. D. 1895.

HOSEA W. LIBBEY.

Witnesses:
CHAS. STEERE,
EDWIN PLANTA.